United States Patent [19]
Hikuma et al.

[11] Patent Number: 5,915,227
[45] Date of Patent: Jun. 22, 1999

[54] CORDLESS TELEPHONE

[75] Inventors: Hideo Hikuma; Kunihiro Takahashi; Katsuhiko Otsuji; Hiroyuki Ishida; Masayasu Fujino; Yuzo Ishida, all of Chiba-ken, Japan

[73] Assignee: Uniden Corporation, Japan

[21] Appl. No.: 09/119,648

[22] Filed: Jul. 21, 1998

Related U.S. Application Data

[62] Division of application No. 08/565,857, Dec. 1, 1995, Pat. No. 5,794,152.

[30] Foreign Application Priority Data

Aug. 4, 1995 [JP] Japan .................................. 7-199681

[51] Int. Cl.$^6$ ..................................................... H04Q 7/26
[52] U.S. Cl. ........................... 455/566; 455/462; 455/555
[58] Field of Search .................................. 455/566, 38.4, 455/426, 462, 463, 465, 550, 554, 555, 564, 565

[56] References Cited

U.S. PATENT DOCUMENTS

| | | | |
|---|---|---|---|
| 4,612,594 | 9/1986 | Yamaura et al. | 455/502 |
| 4,823,362 | 4/1989 | Etoh | 455/422 |
| 5,233,644 | 8/1993 | Yamagata et al. | 455/462 |
| 5,241,688 | 8/1993 | Arora | 455/422 |
| 5,515,420 | 5/1996 | Urasaka et al. | 455/462 |
| 5,519,759 | 5/1996 | Heineck et al. | 455/502 |
| 5,528,597 | 6/1996 | Gerszberg et al. | 455/502 |
| 5,581,595 | 12/1996 | Iwashita et al. | 455/566 |
| 5,602,843 | 2/1997 | Gray | 455/462 |
| 5,722,080 | 2/1998 | Kondo | 455/502 |
| 5,732,356 | 3/1998 | Bolt | 455/403 |

*Primary Examiner*—Wellington Chin
*Assistant Examiner*—Lee Nguyen
*Attorney, Agent, or Firm*—Fish & Richardson PC

[57] ABSTRACT

A cordless telephone consisting of base and handset units is disclosed wherein a control circuit incorporated in the base unit comprises first and second D/A converters, first and second A/D converters, and first and second sync. signal generation circuits. The first and second D/A converters respectively convert digital signals from the handset unit and a PBX. The first and second A/D converters convert the analog signals provided from the first and second D/A converters to transmit them to the PBX and handset unit, respectively. The first sync. signal generation circuit regenerates a first clock signal synchronously with a sync. signal provided from the PBX to render the first A/D and second D/A converters to operate in synchronism with the sync. signal from the PBX. The second sync. signal generation circuit generates a second clock signal which is independent of the sync. signal from the PBX to render the first D/A and second A/D converters to operate in synchronism with the second clock signal. Accordingly, the synchronization between the base and handset units is effected independently of the synchronization signal from the PBX.

2 Claims, 7 Drawing Sheets

CORDLESS TELEPHONE

This is a divisional, of application Ser. No. 08/565,857 filed Dec. 1, 1995, now U.S. Pat. No. 5,794,152.

BACKGROUND OF THE INVENTION

1. Field of the Invention

The present invention relates to a cordless telephone comprising base and handset units, and more particularly to improvements of the functions of a cordless telephone device.

2. Prior Art

FIG. 1 shows a circuit block diagram of a conventional cordless telephone CT, which is a PBX terminal of a PBX (private telecommunication exchange). The cordless telephone is connected to the PBX via PBX lines. In FIG. 1, reference numerals 1 and 2 respectively denote base and handset units.

The base unit 1 of the cordless telephone includes an antenna $1_1$, a duplexer $1_2$, a transmitter $1_3$, a receiver $1_4$, a control circuit $1_5$ and a data transmission-reception circuit $1_6$, while the handset unit 2 includes an antenna $2_1$, a duplexer $2_2$, a transmitter $2_3$, a receiver $2_4$, a control circuit $2_5$, a codec $2_6$, a keyboard $2_7$, a display (LCD) $2_8$, a microphone $2_9$ and a speaker $2_{10}$. Transmission and reception of signals between the base and handset units 1 and 2 are carried out via the antennas $1_1$ and $2_1$.

In a conventional digital telephone system, a PBX terminal is controlled to operate synchronously with a PBX by a synchronization signal provided from the PBX. In a case where a PBX terminal is a cordless telephone as shown in FIG. 1, the digital telephone system requires two synchronization systems. One of the synchronization systems is for synchronizing the PBX with the base unit 1, and the other is for synchronizing the base unit 1 with the handset 2. In addition to this requirement, the synchronization systems need to be synchronized with each other.

Accordingly, in the conventional digital telephone system, the base unit 1 regenerates a synchronization signal on the bases of that received from the PBX using a digital PLL circuit, and sends the regenerated synchronization signal to the handset unit 2 at an interval of, for instance, ten minutes to thereby allow the two synchronization systems to be synchronized with each other for operation.

In order to synchronously control two synchronization systems as described above, however, there are required digital PLL circuits which are particularly precise and thus complicated. In addition thereto, in the digital telephone system, a synchronization clock used in the first synchronization system for synchronizing the PBX and the cordless telephone device varies depending on different PBXS, and this results in a very complicated configuration for synchronization between the first and second synchronization systems.

Each of the base and handset units 1 and 2 shown in FIG. 1 incorporates a ROM storing digital threshold values for received signal strength (RSSI value) in the control circuit $1_5$ or $2_5$. The stored threshold values are fixed values determined in accordance with detection property of a standard IF circuit which detects a reception signal strength. Such IF circuits are included in RF stages of the receiver $1_4$ and $2_4$. The detected reception signal strength in a form of an analog voltage signal is converted to a digital signal at the control circuit $1_5$ or $2_5$, and then is compared with the threshold values stored in the ROM. When the reception signal strength exceeds a certain threshold value, the control circuit $1_5$ or $2_5$ controls to decrease a transmission power of the transmitter $1_3$ or $2_3$, and then when the strength becomes lower than the threshold value, the transmission power is increased, whereby the transmission power is controlled to be increased and decreased stepwisely in accordance with the reception signal strength.

In other words, when the reception signal strength is relatively low, it means that a reception sensitivity is low which may be caused by reasons that the handset unit 2 is positioned far away from the base unit 1 and the like, and in order to practice successful transmission and reception of signals without any malfunction, it is necessary to increase the transmission power. On the contrary, when the reception signal strength is relatively high, it means that the reception sensitivity is high, and in this case, strong transmission power is not required. Due to execute the successful communication between the base and handset units, the transmission power thereat is designed to be controlled in accordance with a judgement made on whether or not a reception signal strength is greater or lower than threshold values stored in the ROM.

However, since the threshold values stored in the ROMs are fixed, there is a risk that a proper control of the transmission power cannot be performed. That is, the detection properties of reception signal strength of IF circuits in ICs may be varied due to production variability and thus some IF circuits used in cordless telephones may supply control circuits with reception signal strengths RSSIs which are different from that of a standard IF circuit, irrespective of the fact that the electric field strengths of signals received by receivers are the same.

Therefore, even if a RSSI value detected at an IF circuit having a detection property different from the standard one is compared with fixed threshold values stored in ROMs and a transmission power control is executed in response to the results of the comparison, a proper control cannot be performed. For instance, it is assumed a case where an IF circuit is used which tends to output the RSSI value of a received signal as a bit greater than that of a standard IF circuit. When a control circuit judges that the RSSI value exceeds the threshold value and then decreases the transmission power, it results in shortage in transmission power, leading to the fact that the transmitted signals cannot be received properly on a reception side.

Referring back to FIG. 1, a key-echo-back function of the conventional cordless telephone is executed as follows. The function is for displaying numbers of dialed keys on the display $2_8$ of the handset unit 2. When a dial key on the keyboard $2_7$ of the handset unit 2 is depressed, its key code data is generated by the control circuit $2_5$ and then transmitted to the PBX via the transmitter $2_3$, duplexer $2_2$, and the antenna $2_1$, and further via the antenna $1_1$, duplexer $1_2$, receiver $1_4$, control circuit $1_5$, and the data transmission/reception circuit $1_6$ those are in the base unit 1.

In the PBX, the key code data so received is converted to key echo back data and the converted data is then returned to the control circuit $2_5$ of the handset unit 2 via a route reverse to the above route, whereby a number corresponding to the depressed dial key is displayed on the display $2_8$ in accordance with the returned key echo back data.

Thus, in the conventional art, since the key code data is sent to the PBX from the cordless telephone and the key echo back data is then sent back from the PBX to the handset unit 2 to display the corresponding dialed number on the display $2_8$, this requires a certain period of time before the display. In addition thereto, there may be caused in the base unit 1 a risk that key code data from the handset unit 2 collides with the data from the PBX, resulting in complicated data processing in the base unit 1.

Further, in the conventional cordless telephone as shown in FIG. 1, there is a problem with a ringing tone of the cordless telephone. That is, when a call signal is received at the telephone, it is notified to a user by a ringing tone occurring at the handset unit 2. Although the sound volume of the ringing tone is normally adjustable, the user cannot verify the preset volume at an optional time and thus the user does not know whether the volume has been set at an intended level, until the ringing tone is actually generated by a call signal. This causes the user to get concerned. In addition, since it is difficult to verify the volume of a ringing tone, there is a case where an adjusted sound volume is greatly differs from an intended one, because of unable affirmation.

Moreover, even if the ringing tone volume is set at a minimum volume level, when a user remove the handset 2 unit from a cradle of the base unit 1 and carries it, the notification of reception of a call signal or paging, which is effected by the ringing tone, sometimes becomes very noisy to the user.

SUMMARY OF THE INVENTION

The present invention has been made to solve the above problems inherent in a cordless telephone device.

A first object of the present invention is to obviate the necessity of a digital PLL circuit having a complicated configuration by allowing base and handset units of a cordless telephone to synchronously operate with each other without using a synchronization signal supplied to the base unit from a PBX.

A second object of the present invention is to reduce a possibility of collision between data from a PBX and data from a handset unit, to display numbers of depressed dial keys on a display of a handset unit within a short time period after they are depressed, and reduce the amount of data wirelessly transmitted between the base and handset units, by allowing a dial-key-echo-back signal not to be returned from the PBX to the handset unit.

A third object of the present invention is to make it possible to properly control a transmission power at a transmitter incorporated in a base or handset unit of a cordless telephone, even if a reception signal strength (RSSI) detection property an IF circuit included in a RF stage of a receiver incorporated in the handset or base unit is different from a standard property, thereby making it possible to prevent malfunctions.

A fourth object of the present invention is to make it possible for a user to verify a sound volume of a ringing call set at a telephone by a simple operation.

A fifth object of the present invention is to make it possible for a user who carries a handset unit of to be notified of a reception of a call signal or paged without generation of audible ringing.

To achieve the above first object, a cordless telephone in accordance with the present invention includes a control circuit incorporated in a base unit, which comprises:

a first D/A converter for converting a digital signal from a handset unit to an analog signal;

a first A/D converter for converting the analog signal from the first D/A converter to a digital signal to transmit it to a PBX via a data transmission/reception circuit of the base unit;

a second D/A converter for converting a digital signal from the PBX to an analog signal;

a second A/D converter for converting the analog signal from the second D/A converter to a digital signal to transmit it to the handset unit via a transmitter of the base unit;

a first synchronization control means for regenerating a first clock signal synchronously with a synchronization signal provided from the PBX to render the first A/D and second D/A converters to operate in synchronism with the synchronization signal from the PBX; and a second synchronization means for generating a second clock signal which is independent of the synchronization signal from the PBX to render the first D/A and second A/D converters to operate in synchronism with the second clock signal, whereby the synchronization between said base and handset unit being effected independently of the synchronization signal from the PBX.

In order to achieve the second object of the present invention, a cordless telephone according to the present invention comprises:

a buffer memory incorporated in a handset unit, for storing a key code which is correspondingly generated when a dial key is depressed;

key code transmission control means incorporated in the handset unit, for transmitting the generated key code to a base unit via a transmitter of the handset unit;

acknowledge transmission means incorporated in the base unit, for generating and transmitting an acknowledge signal to the handset unit when the key code transmitted from the handset unit is received at the base unit;

display means incorporated in the handset unit; and display control means incorporated in the handset unit, for controlling to display the number of the dialed key on the display means by reading out the key code from the buffer memory when the handset unit receives the acknowledge signal from the acknowledge transmission means, thereby a dial-key-echo-back signal from the PBX being not required to be transmitted to the handset unit.

In order to achieve the third object of the present invention, each of base and handset units of a cordless telephone comprises:

a transmitter and receiver;

a RSSI detection circuit for detecting a reception signal strength of a signal received at the receiver;

storage means storing at least one threshold value of a reception signal strength value which is dependent on inherent electric field strength-detection voltage property of the RSSI detection circuit; and transmission power control means for comparing the reception signal strength value detected by the RSSI detection circuit with the threshold value stored in the storage means and for controlling to change transmission power of the transmitter up or down when the former becomes lower or higher than the latter, whereby the transmission power of the transmitter is controlled in response to an electric field strength of the signal, without depending upon the detection property of said RSSI detection circuit.

In order to accomplish the fourth object of the present invention, a cordless telephone according to the present invention includes a handset unit which comprises:

storage means for storing a ringing tone volume level which has been set;

means for detecting whether a ringing tone volume adjustment key is depressed within a predetermined time period from when it was last depressed;

means for reading out the ringing tone volume level from the storage means when the detection means detects that no ringing tone volume adjustment key is depressed within the predetermined time period;

means for generating ringing tone having the ringing tone volume level read out from the storage means;

means for displaying the ringing tone volume level read out from the storage mean; and means for controlling to change the ringing tone volume level and to replace the previous level stored in the storage means with the new level when the detection means detects that the ringing tone volume adjustment key is depressed within the predetermined time period, whereby a user can verify the currently set ringing tone volume level.

In order to achieve the fifth object of the present invention, a cordless telephone according to the present invention includes a handset unit which comprises:

vibrator means for generating mechanical vibrations when the handset receives a call signal when it is in an enable state;

means for selectively switching the vibrator means and ringing tone generation means to be enabled; and means for forcedly enabling the ringing tone generation means when the handset unit is replaced on a cradle of a base unit.

DETAILED DESCRIPTION OF PREFERRED EMBODIMENTS

Figure 1:
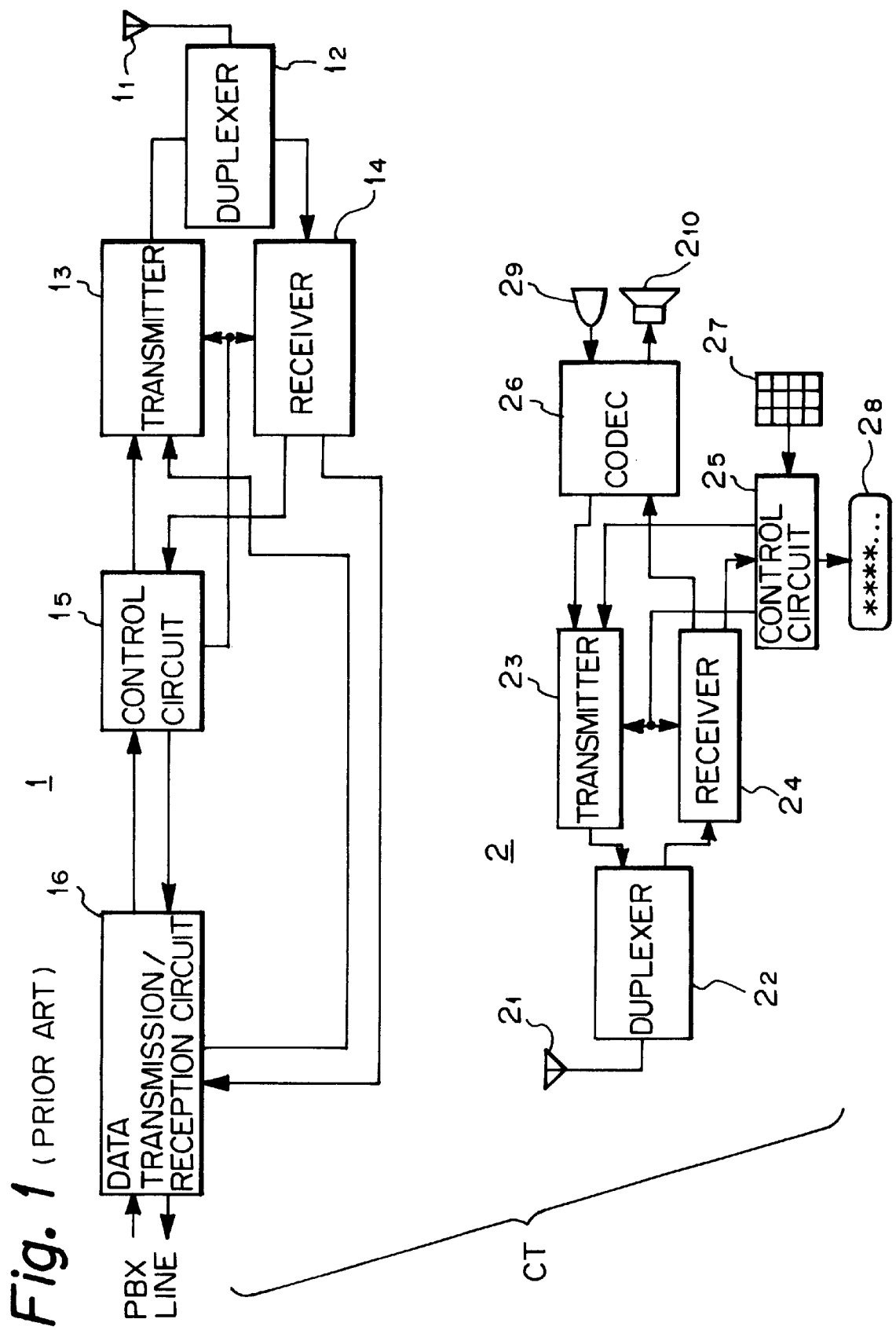
FIG. 1 is a block diagram showing a configuration of a conventional cordless telephone.

The present invention will be understood by the following explanation with reference to the attached drawings. It is to be noticed that the same or identical components in the drawings are denoted by the same numerals, and an outlined constitution of the present invention can be illustrated as shown in FIG. 1 and thus in the following explanation, FIG. 1 will be referred to in explaining the present invention.

Figure 2:
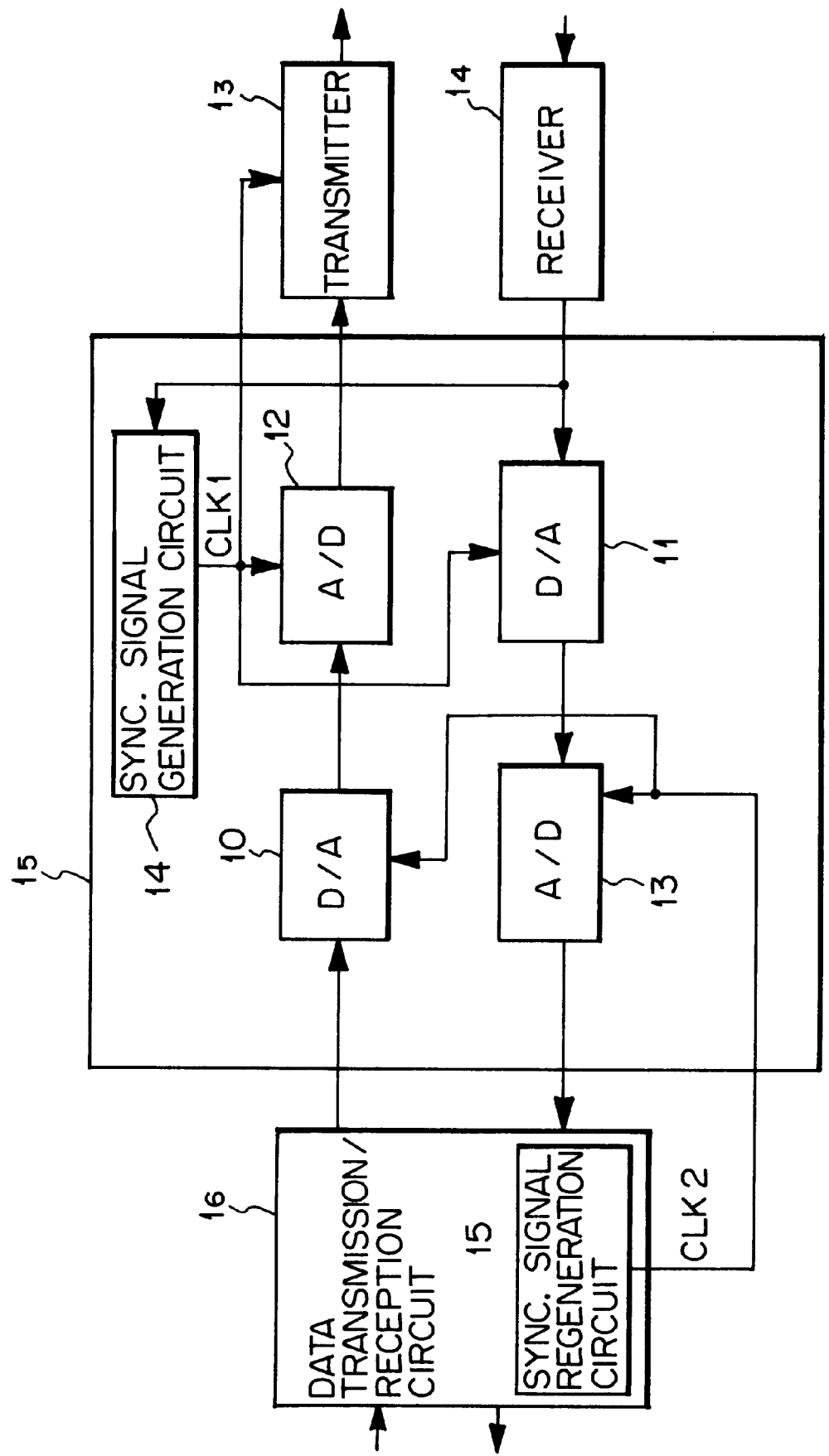
FIG. 2 is a block diagram showing a configuration of a control circuit in a base unit of a cordless telephone in accordance with the present invention, wherein the base unit and a handset unit of the cordless telephone are capable of synchronously operating with each other, independently of a synchronization signal from a PBX.

FIG. 2 shows an example according to the present invention wherein D/A (digital/analog) converters 10, 11 and A/D (analog/digital) converters 12, 13 are newly provided in the control circuit $1_5$ of the base unit 1. Digital signals input to the control circuit $1_5$ from the receiver $1_4$ and data transmission and reception circuit are temporarily converted to analog signals and the analog signals are then converted back to the digital signals to output therefrom. The control circuit $1_5$ further includes a synchronization signal generation circuit 14 which generates or regenerates a clock signal CLK1 to synchronize the operations of the base and handset units 1 and 2. Numeral 15 denotes a synchronization regeneration circuit which is normally incorporated in the data transmission/reception circuit $1_6$ and regenerates a clock signal CLK2 having the same phase as that of a synchronization signal transmitted from the PBX. The circuit 15 is comprised with a digital PLL circuit.

In the example shown in FIG. 2, when the control circuit $1_5$ of the base unit 1 receives a PCM signal from the PBX via the data transmission/reception circuit $1_6$, the PCM signal is converted to an analog signal in the D/A converter 10 and then is supply to the A/D converter 12. The timing of the conversion at the D/A converter is determined by the regenerated clock signal CLK2 from the synchronization signal regeneration circuit 15. The analog signal obtained at the D/A converter is then provided to the A/D converter 12 where the signal is again converted to a PCM signal. The conversion at the A/D converter is practiced synchronously with the clock signal CLK1 from the synchronization generation circuit 14. The PCM signal provided from the A/D converter is transmitted to the handset unit via he transmitter 13, and the duplexer 12 and antenna 11 (FIG. 1) of the base unit 1.

On the other hand, when the control circuit $1_5$ receives a PCM signal from the handset unit 2 via the antenna $1_1$, duplexer $1_2$ and receiver $1_4$, the PCM signal is converted to an analog signal at the D/A converter 11, and then the analog signal so converted is again converted to a PCM signal by the A/D converter 13. The conversions at the D/A and A/D converter 11 and 13 are respectively executed at the timing of the clock signals CLK1 and CLK2. The PCM signal obtained at the A/D converter 13 is transmitted to the PBX via the data transmission/reception circuit $1_6$.

Accordingly, since any digital signal is at once converted to an analog signal and then it is converted to a digital signal, it is possible to separate the synchronization system including the base and handset units 1 and 2 from that including the PBX and base unit 1. Therefore, it is not necessary to provide complicated PLL circuit in the cordless telephone, resulting in a simple configuration thereof.

Figure 3:
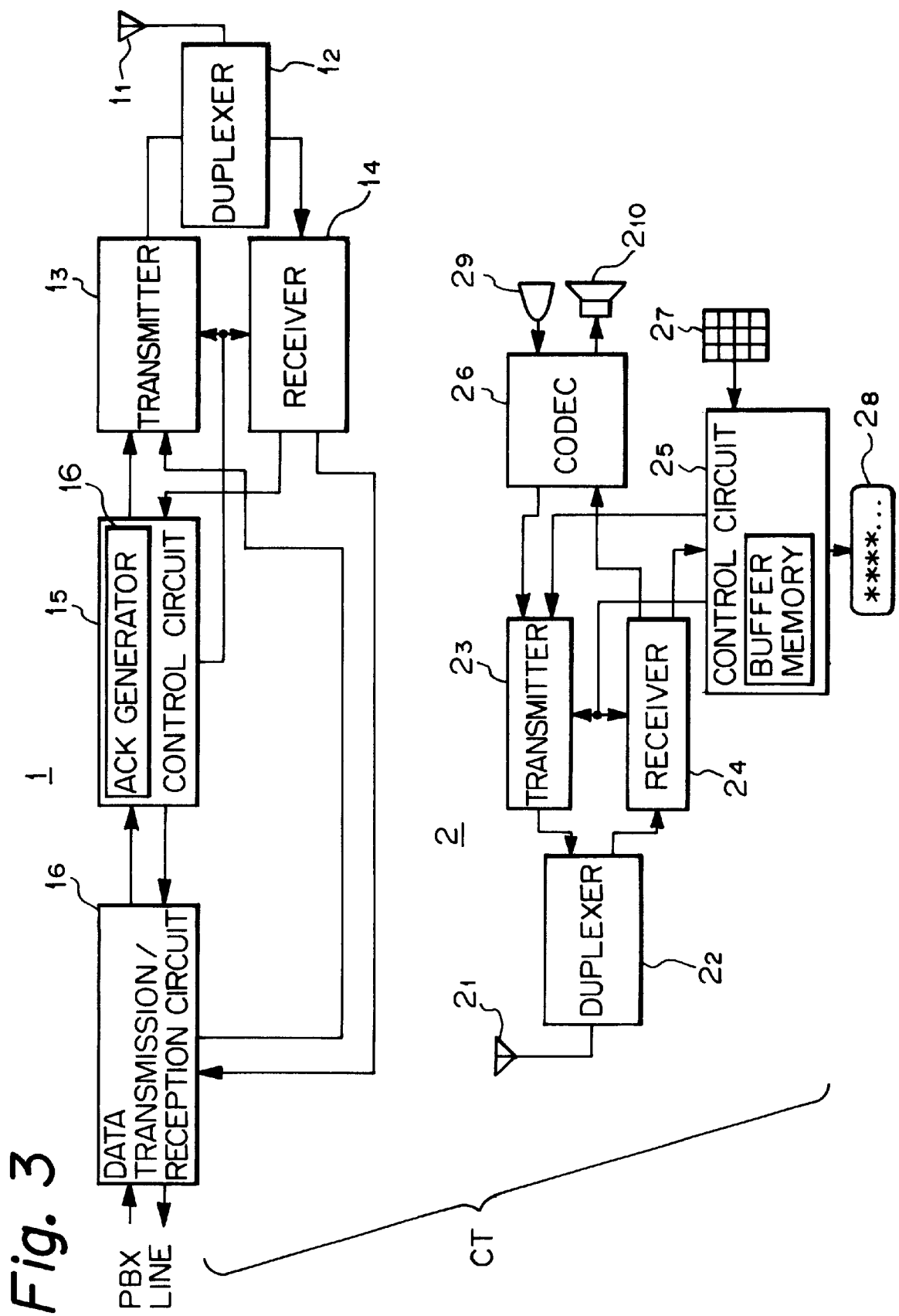
FIG. 3 is a block diagram showing a configuration of a cordless telephone in accordance with the present invention which is capable of realizing a local-key-echo-back-function that does not need a key-echo-back-signal from a PBX to a handset unit.

FIG. 3 shows a block diagram of a cordless telephone device which can realize a local-key-echo-back-function. The cordless telephone in FIG. 3 includes a key code acknowledge signal (ACK) generator 16 in the control circuit $1_5$ of the base unit 1 and a buffer memory 20 in the control circuit $2_5$ of the handset unit 2.

Figure 4:
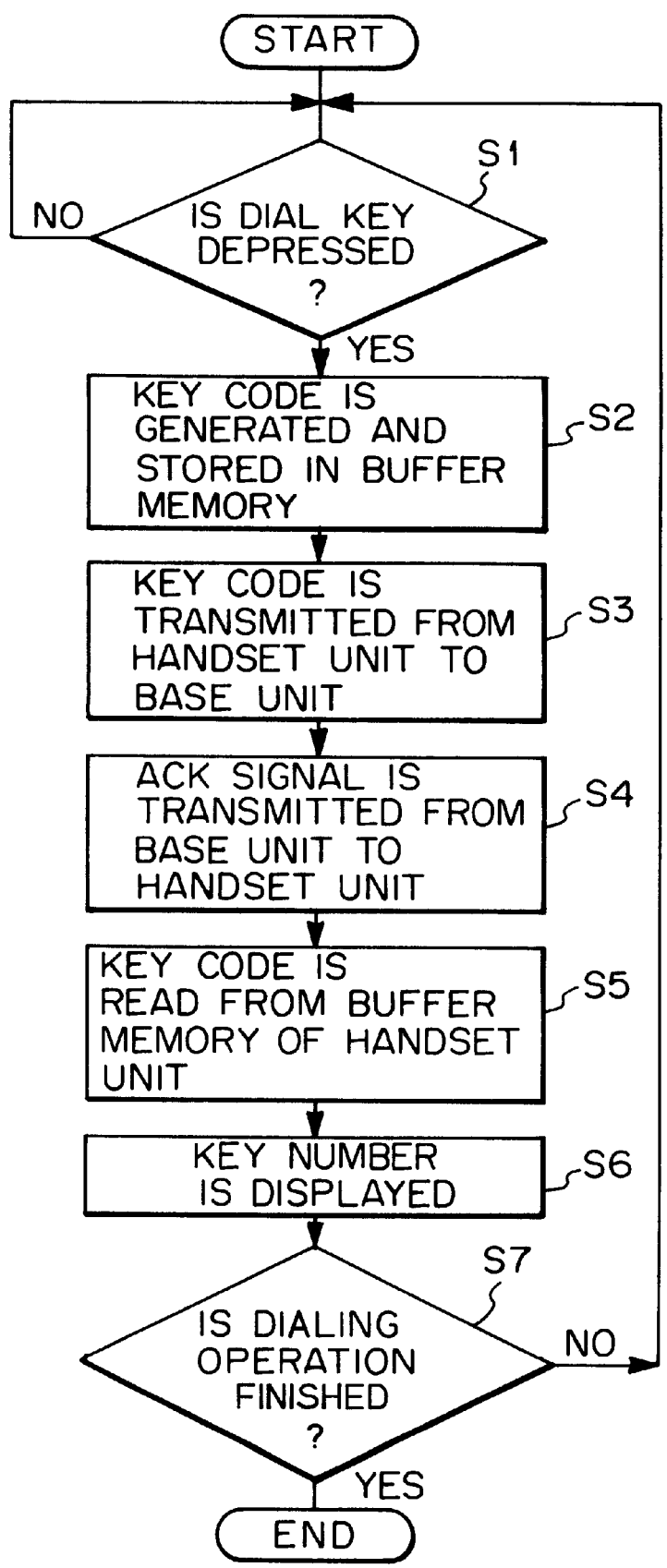
FIG. 4 is a flowchart explaining an operation of the local-key-echo-back function of the cordless telephone shown in FIG. 3.

The local-key-echo-back function of the cordless telephone shown in FIG. 3 will next be explained referring to FIG. 4. First, it is judged at Step $S_1$ whether a dial key or push button on the keyboard $2_7$ is depressed. When, for instance, the key "1" is depressed, then the process proceeds to Step S2, where the control circuit $2_5$ generates a key code corresponding to the depressed key "1" and stores it in the buffer 20. Simultaneously with the storage of the key code, the generated key code is transmitted to the base unit 1 via the transmitter $2_3$, duplexer $2_2$ and antenna $2_1$ of the handset unit 2.

In the base unit 1, the control circuit $1_5$ receives the key code via the antenna $1_1$, duplexer $1_2$ and receiver $1_4$, and at Step S4, the ACK generator 16 generates and transmits the ACK signal to the handset unit 2, which indicates that the base unit 1 has received the key code from the handset unit 2. When the control circuit $2_5$ of the handset unit 2 receives the ACK signal, the key code stored in the buffer memory 20 is read out at Step S5, and then at Step S6, the number corresponding to the key code or the depressed dial key is displayed on the display $2_8$. For instance, in a case where the dial key "1" is depressed, the number "1", is displayed in a right end portion of the display $2_8$.

Thereafter, the process goes to Step S7 where whether or not a whole dial key operation has been completed is judged. If it is judged that the operation has not been finished yet, the process returns to Step S1 and another dial key input is waited.

Where the next depressed key, for instance, the key "2" is depressed, Steps S2–S5 are repeated, and at Step S6, the "1" displayed in the right end portion of, the display $2_8$ is shifted leftward of the display, while the new number "2" is displayed in the right end portion instead. Thus, the numbers of the depressed dial keys are sequentially displayed on the display $2_8$. At Step S7, when it is judged that the whole dial key manipulation has been finished, the local-key-echo-back process is terminated.

In the local-key-echo-back process, as in the case of a conventional cordless telephone, when the whole dial key manipulation is completed, the control circuit $1_5$ of the base unit 1 transmits the associated key codes to the PBX through the data transmission/reception circuit $1_6$, and in response thereto the PBX sends back dial-key-echo-back signals to the control circuit $1_5$ of the base unit 1. Although these signals arrives at the control circuit $1_5$, no further processing based on the signals is executed.

Figure 5A:
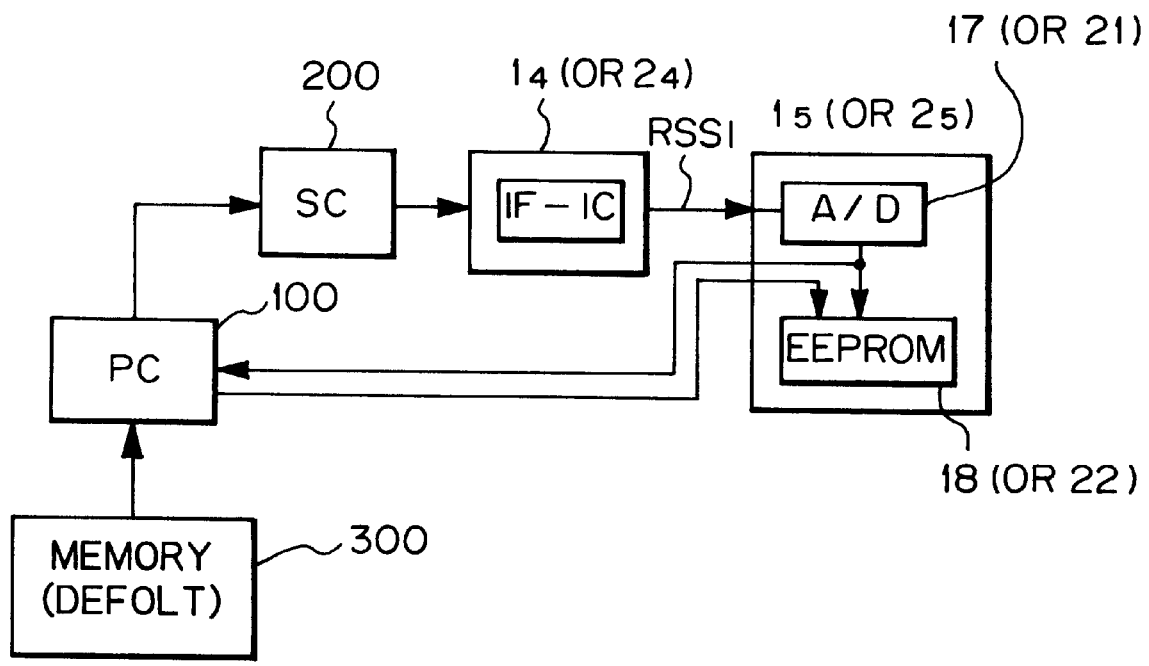
FIG. 5(A) is a block diagram showing a measuring device in accordance with the present invention for measuring threshold values of reception signal strengths (RSSIs) for an IF circuit which detects the RSSIs.

FIG. 5(A) shows a configuration of a test device, by which threshold values of a reception signal strength are detected for each IF circuit which may be incorporated in a RF stage of the receiver $1_4$ or $2_4$ of the base unit 1 or the handset unit 2. This test is to be carried out for the base and handset units 1 and 2, before the shipment of products.

In FIG. 5(A), reference numeral 100 denotes a personal computer (PC), and 200 a standard signal generator (SG), which sequentially generates standard signals associated with a plurality of electric field strengths set in advance such as −65 dBm, −90 dBm and −95 dBm, under the control of the computer. The generated standard signals are supplied to a suitable node such as a junction point between the antenna $1_1$ (or $2_1$) of the base unit and the duplexer $1_2$ (or $2_2$), and voltages representing reception signal strengths (RSSIs) corresponding to the standard signals as well as the RSSI detection property of the test IF sample are sequentially generated by the IF circuit. These voltages are converted to digital values by means of an A/D converter 17 (or 21) incorporated in the control circuit $1_5$ or $2_5$ and the digital values are stored in EEPROM 18 (or 22) of the control circuit.

Reference numeral 300 denotes a memory which has stored default threshold values of the standard IF circuit. The default threshold values have been previously obtained by providing the standard signals from the SC generator 200 to the standard IF circuit and by detecting the RSSI values thereof. When the detected RSSI values for the IF sample are out of respective permissible ranges, the computer 100 judges it and the default threshold values stored in the memory 300 are written in the EEPROM 18 (or 22), instead of the threshold values obtained as the results of measurement.

As is described above, since a plurality of threshold values of the RSSI signals associated with the predetermined standard signals and the utilized IF circuit are measured and stored in the EEPROM, it is possible to control transmission powers of the base and handset units to properly and stepwisely vary in accordance with which range between the threshold values the RSSI value in a normal use is located.

Figure 5B:
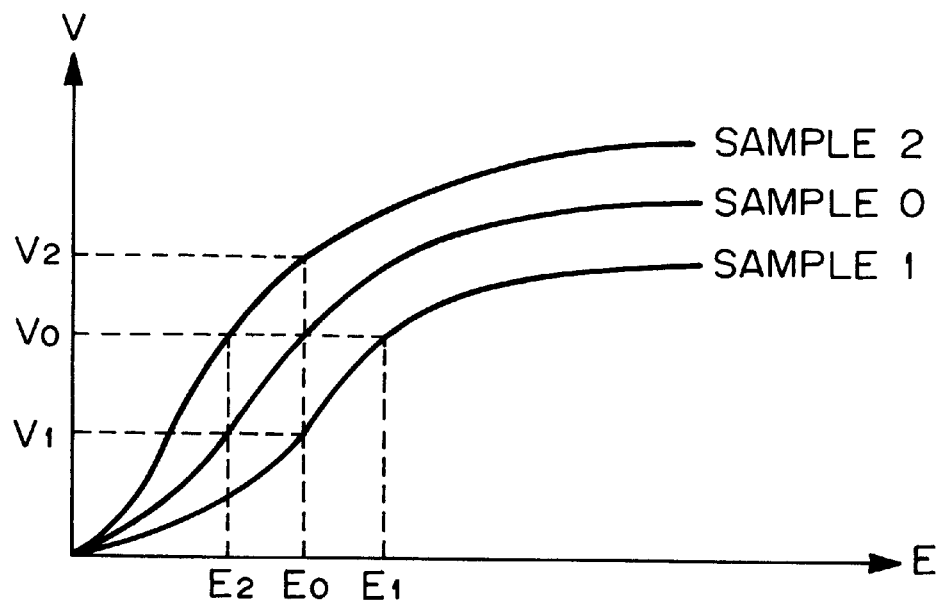
FIG. 5(B) is a graph representing relationships between a voltage corresponding to the RSSIs and electric field strength for different samples of IF circuits.

FIG. 5(B) shows a graph representing the relationship between electric field strengths (E) and voltages (V) associated with RSSI values for three samples. It is assumed that Sample 0 is a standard IF circuit.

In a conventional cordless telephone, since threshold value for the RSSI signal stored in a ROM are obtained depending to Sample 0 and thus are fixed every IF circuit. When one of the stored threshold value corresponds to the voltage $V_0$ which corresponds to an electric field strength $E_0$. However, in Sample 1, the electric field strength $E_1$ corresponding to the threshold voltage $V_0$ is greater than $E_0$, or $E_1 > E_0$, and in Sample 2, the corresponding electric field strength is $E_2$ which is lower than $E_0$, or $E_2 < E_0$. Consequently, in the conventional telephone, since the fixed threshold value $V_0$ is compared with the detected RSSI value to change the transmission power, if Sample 1 is utilized as an IF circuit, the transmission power is not lowered until the electric field strength of the received signal becomes the considerably high value $E_1$, and on the contrary, as Sample 2, the transmission power is lowered at the considerable low value $E_2$.

In the present invention, since the properties of individual IF circuits are actually tested before the shipment of products and threshold values are obtained for each utilized IF circuit, as the threshold values for the threshold electric field strength $E_0$, the voltage values $V_0$, $V_1$ and $V_2$ are stored in the EEPROM in the control circuit $1_5$ or $2_5$ for Samples 0, 1, and 2. Therefore, even if there is caused variability in the RSSI detection properties of IF circuit during production thereof, the transmission power can be suitably switched when the received signal reaches the predetermined electric field strength $E_0$.

It is to be noted that when the base unit 1 (or the handset unit 2) changes the transmission power in accordance with the detected RSSI value, the unit sends to the handset unit 2 (or the base unit 1) a command signal to render the handset unit 2 (or the base unit 1) to have the same transmission power as that of the base unit 1 (or the handset unit 2), whereby both units may transmit an identical power.

Furthermore in the present invention, a ringing tone volume adjustment function is additionally provided, a constitution and operation of which will be apparent from the description below, with reference to FIGS. 6(A) and 6(B).

Figure 6A:
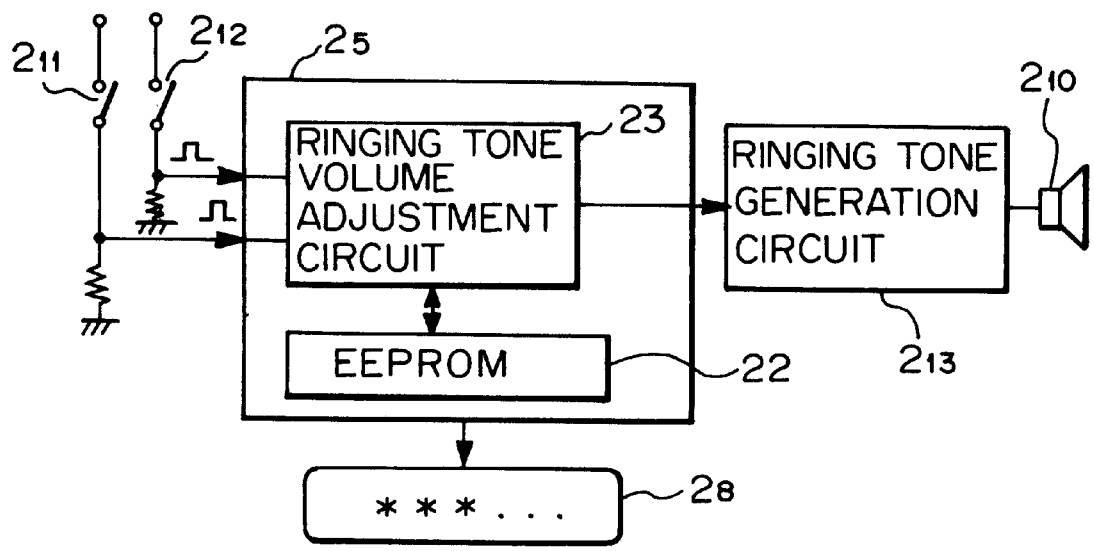
FIG. 6(A) is a block diagram showing a constitution of the present invention which is capable of adjusting a sound volume of the ringing call.
Figure 6B:
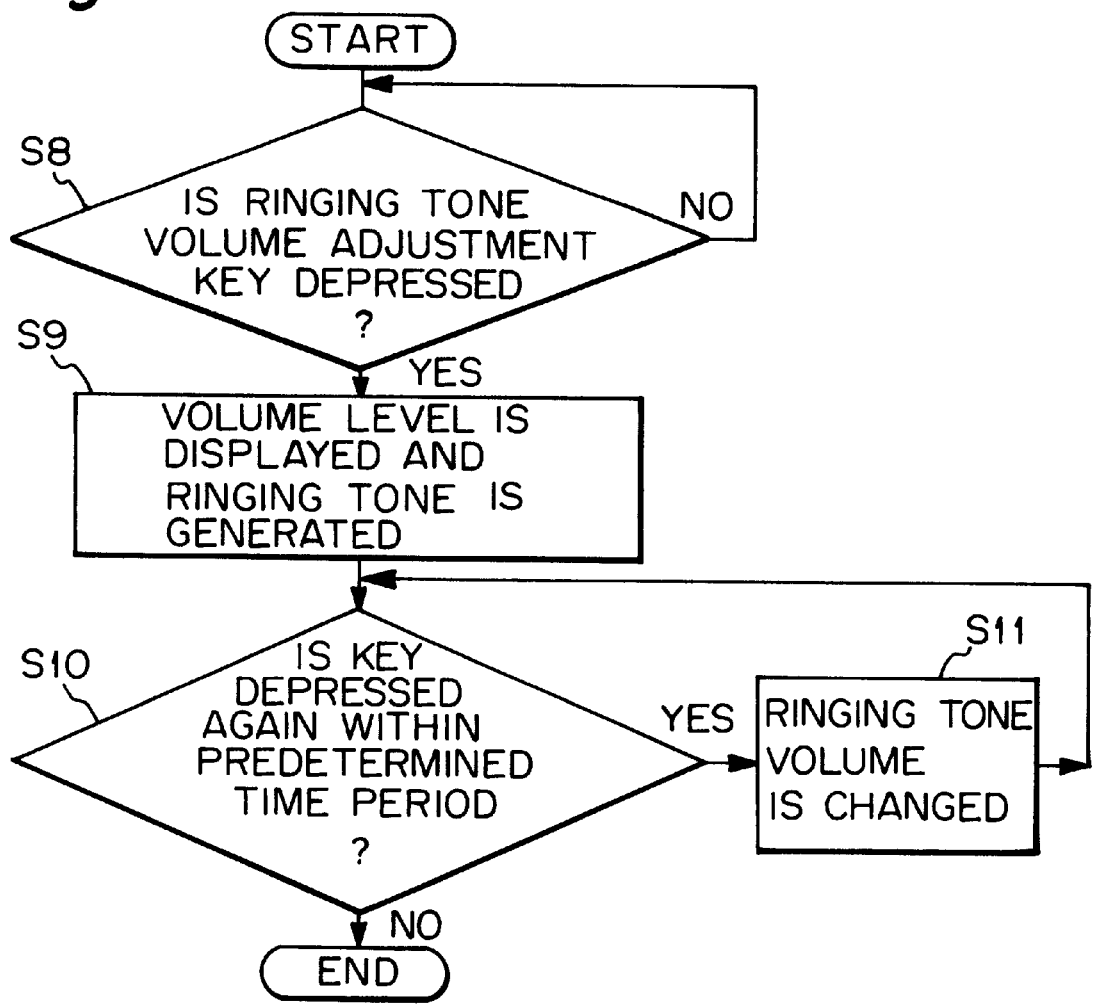
FIG. 6(B) is a flowchart explaining the sound volume adjusting function executed by the constitution shown in FIG. 6(A)

When a ringing tone volume adjustment key, or one of ringing tone volume up and down keys $2_{11}$ and $2_{12}$ shown in FIG. 6(A), which are provided on a suitable position, for instance a side of the handset unit 2, is depressed once by a user, a ringing tone volume adjustment circuit 23 detects it, and reads from an EEPROM 22 a ringing tone volume level which has been set and stored therein. The circuit 23 and EEPROM 22 are included in the control circuit $2_5$ of the handset unit 2. The circuit 23 controls to display the read-out value on the display $2_8$, and drives a ringing tone generation circuit or tone generator $2_{13}$ to generate a ringing tone having the read-out volume by means of the speaker $2_{10}$.

In a case where the user is satisfied with the ringing tone volume, it may be left as it is. On the other hand, when the user wants to change the volume and hence depresses the ringing tone adjustment key within a pre-determined time period after previously depressing it or the other, the volume level is stepwisely changed up or down by means of the adjustment circuit 23. The changed volume level or new volume level is written in the EPROM 22 and the value on the display $2_8$ is replaced with the new one. When the volume adjustment key is depressed again within the pre-determined time period thereafter, the volume is further increased or decreased at a predetermined pitch.

The ringing tone volume adjustment operation will next be explained in detail, by referring to a flowchart shown in FIG. 6(B). It is judged at Step S8 whether the ringing tone volume adjustment key is depressed, and if so, the volume value stored in the EEPROM is read out and then is displayed on the display $2_8$ at Step S9. Simultaneously, a ringing tone having the read-out level is generated from the speaker $2_{10}$ by means of the ringing tone generation circuit $2_{13}$.

Next, the process proceeds to Step S10, where whether the ringing tone volume adjustment key is depressed again within the predetermined time period from the previous key depression is judged, and if so, then moves to Step S11 where the ringing tone volume level is up/down-shifted by a predetermined level. The process thereafter returns to Step S10. In a case where it is judged at Step S10 that the adjustment key is not depressed within the predetermined time period, the ringing tone volume adjustment mode is then ended.

Thus, if after the user has once completed the volume adjustment, in other words, after a lapse of the predetermined time period since the volume adjustment key was last pressed whenever one of the up and down keys $2_{11}$ and $2_{12}$ is depressed again, a ringing tone with the previously-set volume level is generated from the speaker $2_{10}$, whereby the user can verify the set volume level. If the user is not satisfied with the volume, another adjustment may be carried out in line with Steps S8–S11 shown in FIG. 6(B).

Consequently, since a user can carry out the ringing tone volume adjustment while listening to a ringing tone with a previously-set level, he or she can verify the level and easily change or set it at an intended level.

Figure 7:
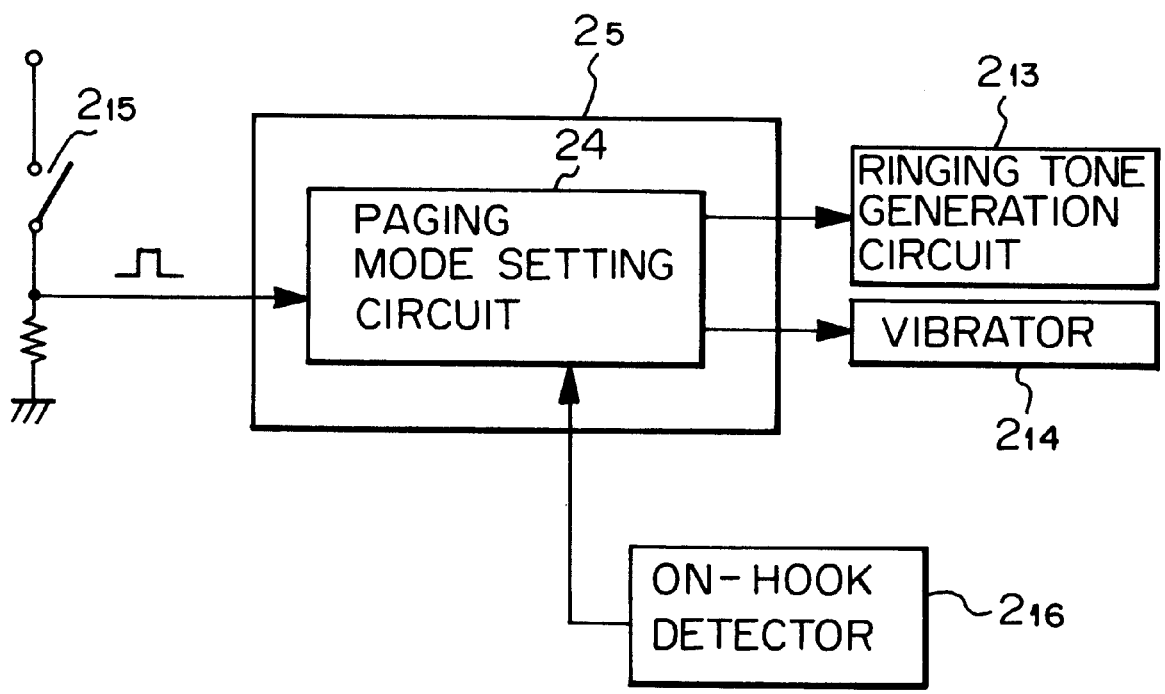
FIG. 7 is a block diagram showing a configuration of the present invention which is capable of notifying a reception of a call signal to a user by mechanical vibrations but no audible call.

In addition to a ringing tone paging mode in which a call signal reception is notified by a ringing tone generated by means of the ringing tone generation circuit $2_{13}$ and speaker $2_{10}$ shown in FIG. 6(A), a cordless telephone according to the present invention is also constructed to have a vibration paging mode in which a user notices a call signal reception by a mechanical vibration. That is, if a user carries the handset unit 2 when a call signal is received thereat, it may be notified to the user by a vibration caused with a mechanical vibrator $2_{14}$ incorporated in the handset unit 2, as shown in FIG. 7.

These ringing tone paging mode and vibration paging mode are changeable by turning on and off a switch $2_{15}$ which is also positioned on, for example, a side of the handset unit, and by enabling either the ringing tone generation circuit $2_{13}$ or the vibrator $2_{14}$ by means of a paging mode setting circuit 24. Furthermore, in a case where the handset unit 2 is replaced on a cradle of the base unit 1 with the vibration paging mode being set, an on-hook detector $2_{16}$ detects the on-hook of the handset unit 2 and the paging mode setting circuit 24 is automatically changed to the ringing tone paging mode.

Having described specific embodiments of the present invention, it is believed obvious that modification and variation thereof is possible in light of the above teachings.

For example, some or all of the embodiments shown in FIGS. 2, 3, 6, and 7 can be combined with each other. Further, any of the embodiments can be applied to a cordless telephone disclosed in Japanese Patent Application No. 6-21462 filed by the applicant of the present invention, in which a protocol convertor is additionally inserted between the control circuit 13 and data transmission/reception circuit 14 to be capable of being connected with a digital PBX having a protocol different from that of the telephone.

We claim:

1. A cordless telephone consisting of a base unit connected to a PBX and a handset unit which wirelessly transmits or receives signals to or from said base unit, comprising:

a buffer memory incorporated in said handset unit, for storing a key code which is correspondingly generated when a dial key is depressed;

key code transmission control means incorporated in said handset unit, for transmitting the generated key code to said base unit via a transmitter of said handset unit;

acknowledge transmission means incorporated in said base unit, for generating and transmitting an acknowledge signal to said handset unit when the key code transmitted from said handset unit is received at said base unit;

display means incorporated in said handset unit; and display control means incorporated in said handset unit, for controlling to display the number of the dial key on said display means by reading out the key code from said buffer memory when said handset unit receives the acknowledge signal from said acknowledge transmission means, thereby a dial-key-echo-back signal from said PBX being not required to be transmitted to said handset unit.

2. A method of displaying numbers of dialed keys on a display of a handset unit of a cordless telephone, comprising the steps of:

(a) generating a key code when a dial key is depressed at said handset unit;

(b) storing the key code in a buffer memory incorporated in said handset unit;

(c) transmitting the generated key code from said handset unit to a base unit of said cordless telephone via a transmitter of said handset unit;

(d) generating an acknowledge signal at said base unit and transmitting it to said handset unit when the key code transmitted from said handset unit is received at said base unit;

(e) reading out the key code from said buffer memory and displaying the dial key number associated with the read out key code on the display when said handset unit receives the acknowledge signal; and (f) repeating the steps (a)–(e) until the depression of dial keys is finished, thereby a dial-key-echo-back signal from said PBX being not required to be transmitted to said handset unit, in order to display the numbers of the dialed keys.

* * * * *